(12) United States Patent
Hood et al.

(10) Patent No.: US 9,577,270 B2
(45) Date of Patent: Feb. 21, 2017

(54) PLATE PROCESSING

(75) Inventors: Peter David Hood, Loughborough (GB); Antony Richard Wilson, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 641 days.

(21) Appl. No.: 13/510,262

(22) PCT Filed: Nov. 9, 2010

(86) PCT No.: PCT/GB2010/002052
§ 371 (c)(1),
(2), (4) Date: Jun. 27, 2012

(87) PCT Pub. No.: WO2011/061472
PCT Pub. Date: May 26, 2011

(65) Prior Publication Data
US 2012/0264038 A1     Oct. 18, 2012

(30) Foreign Application Priority Data

Nov. 17, 2009  (GB) .................................. 0920100.5

(51) Int. Cl.
*H01M 4/04* (2006.01)
*H01M 4/88* (2006.01)
*H01M 8/02* (2016.01)

(52) U.S. Cl.
CPC ......... *H01M 4/8803* (2013.01); *H01M 4/8817* (2013.01); *H01M 8/0206* (2013.01); *Y02E 60/50* (2013.01); *Y10T 29/49204* (2015.01)

(58) Field of Classification Search
USPC ..... 429/209–246, 523–535; 29/623.1–623.5, 29/592.1, 876
See application file for complete search history.

(56) References Cited

U.S. PATENT DOCUMENTS

| | | | | |
|---|---|---|---|---|
| 2,362,884 | A | * | 11/1944 | Clark ............................. 427/364 |
| 2,845,019 | A | * | 7/1958 | Stiefel ............................. 101/96 |
| 3,683,756 | A | | 8/1972 | Wilson |
| 4,842,573 | A | * | 6/1989 | Peter et al. ................... 493/412 |
| 5,147,273 | A | | 9/1992 | Rottmann et al. |
| 5,300,008 | A | * | 4/1994 | Lee et al. ...................... 493/320 |

(Continued)

FOREIGN PATENT DOCUMENTS

| | | |
|---|---|---|
| CN | 1406159 A | 3/2003 |
| DE | 3 431 509 | 1/1986 |

(Continued)

OTHER PUBLICATIONS

Hungary Patent Application No. 201203485-6; Written Opinion; dated Jun. 13, 2013; 6 pages.

(Continued)

*Primary Examiner* — Jonathan G Leong
(74) *Attorney, Agent, or Firm* — Baker & Hostetler LLP

(57) ABSTRACT

A method of processing a linked series of metallic plates, in which each plate (9) is connected to an adjacent plate along adjoining edges (8), the method comprising: providing the series of plates as a first fan-folded stack of plates (1); drawing the plates in sequence from the stack; applying a surface treatment to one or more of the plates; and stacking the plates in reverse order to form a second fan-folded stack of plates (5).

17 Claims, 5 Drawing Sheets

(56) References Cited

U.S. PATENT DOCUMENTS

| | | |
|---|---|---|
| 6,595,089 B1 * | 7/2003 | Stojanowski ............... 81/165 |
| 6,832,571 B2 | 12/2004 | Eagles |
| 7,024,736 B2 | 4/2006 | Ragland et al. |
| 7,049,024 B2 | 5/2006 | Leban |
| 8,870,977 B2 * | 10/2014 | Lee ............................. 29/623.3 |
| 2005/0019652 A1 * | 1/2005 | Fauteux ...................... 429/129 |
| 2005/0129917 A1 | 6/2005 | Ragland |
| 2005/0241732 A1 | 11/2005 | Ishigami et al. |
| 2007/0113614 A1 | 5/2007 | Durney et al. |

FOREIGN PATENT DOCUMENTS

| | | |
|---|---|---|
| GB | 1 414 796 | 11/1975 |
| GB | 2 073 716 | 10/1981 |
| GB | 2 374 306 | 10/2002 |
| GB | 2 387 343 | 10/2003 |
| WO | WO 2007/088551 | 8/2007 |

OTHER PUBLICATIONS

Hungary Patent Application No. 201203485-6; Written Opinion; dated Apr. 22, 2014; 8 pages.

* cited by examiner

PLATE PROCESSING

RELATED APPLICATION

This application claims the full Paris Convention Priority from, and is a U.S. National Stage entry of PCT/GB2010/002052 filed Nov. 9, 2010; which is based upon GB 0920100.5, filed Nov. 17, 2009, the contents of which are incorporated by reference, each as if fully set forth herein in its entirety.

FIELD

The invention relates to processing metallic plates, for example, for use in manufacturing fuel cell electrode plates.

BACKGROUND

Electrode or separator plates for fuel cells, i.e. in the form of anode or cathode plates, need to meet stringent requirements to avoid or remove any contamination, and typically require a series of different processing steps to be applied before the plates can be assembled into a fuel cell stack. Various types of coatings and other surface treatments may be required, which may need to be carried out in an enclosed chamber, for example in a vapour or ion deposition process. To prevent the risk of non-adherence of coatings, the surfaces of the plates to be coated must first be free of organic contaminants such as grease or oil. The preceding stamping operations used for applying surface features to the plates cannot however be generally assumed to be clean processes, which results in a significant risk of cross-contamination. The raw material, which may be in the form of a sheet metal roll, also cannot be assumed to be clean. Given that volume production of fuel cell parts requires a large number of such plates to be handled in rapid succession, a solution that enables continuous feeding of metallic plates through a batch type process is ideally required.

Current known processes for applying surface treatments to electrode plates include handling of individual plates and applying various surface treatments to the plates individually, as for example disclosed in US 2005/0241732, in which pressed plates are treated with a passivating solution followed by rinsing and drying steps.

A problem with existing processes is that automated handling of individual plates involves complex machinery.

A further problem, in particular in relation to fuel cell electrode or separator plates, is that such plates are thin and may be prone to damage by being handled individually.

A further problem is, on a mass-production scale where hundreds of thousands of plates are to be processed, how to handle batches of plates between processes, some of which may require a break in a production line.

A further problem is how to minimise on use of resources such as solutions for surface treatment and to reduce energy usage for applying other treatments such as surface deposited layers.

A further problem is how to minimise the space required for surface treatment apparatus configured to handle many thousands of plates in rapid succession.

It is an object of the invention to address one or more of the above mentioned problems.

SUMMARY OF THE INVENTION

In accordance with the invention there is provided a method of processing a linked series of metallic plates, in which each plate is connected to an adjacent plate along adjoining edges, the method comprising: providing the series of plates as a first fan-folded stack of plates; drawing the plates in sequence from the stack; applying a surface treatment to one or more of the plates; and, stacking the plates in reverse order to form a second fan-folded stack of plates.

By processing the metallic plates as a fan-folded stack, problems relating to handling of individual plates are substantially reduced, since the plates only need to be handled in the form of readily transported batches of plates. Such batches would be provided in the form of cartridges containing large numbers of plates in a highly compact form.

In preferred embodiments, a plurality of the metallic plates in at least the second fan-fold stack comprise one or more fuel cell electrode plates. As applied to the production of fuel cell electrode plates, the invention has substantial advantages over existing techniques, not least because the problems associated with applying the various different surface processing treatments required for such types of plates are substantially reduced.

In order to increase the efficiency of the process further, each plate may comprise a regular array of fuel cell electrode plates.

The surface treatment applied to the plates may comprise one or more of a cleaning, stamping, spraying, moulding and heat treatment process.

In an exemplary cleaning process, the first fan-folded stack of plates may be at least partially immersed in a cleaning solvent. The amount of solvent used during the process is minimised by immersing the stack, rather than each individual plate, in the cleaning solvent.

Each plate may be connected to an adjacent plate along a line of weakened material joining the plates. Such a join, typically referred to as a 'living hinge' can be designed to withstand repeated folding and unfolding steps, sufficient to subject a stack of plates to a series of processing steps, before separating each plate in a final step before assembly of the plates into a fuel cell stack.

The line of weakened material may be provided by a series of perforations. This type of fold can be applied, for example, during a stamping process as the stack of plates is prepared from a raw sheet metal reel.

Alternatively, each plate may be connected to an adjacent plate by a hinge, which may be in the form of a temporary joining piece that is removed once the processing steps are completed. The hinge may comprise one or more corresponding tab and slot connections joining adjacent plates together. This type of join may be suitable where individual plates are stamped from a starting material, for example a larger sheet of metal, followed by a process that joins the plates together to form a stack.

According to a second aspect of the invention there is provided a cartridge of metallic plates for a surface treatment process, the cartridge comprising a linked series of metallic plates, in which each plate is connected to an adjacent plate along adjoining edges forming a fan-folded stack.

According to a third aspect of the invention there is provided an apparatus for applying a surface treatment to a series of metallic plates, the apparatus comprising: a first cradle configured to receive a first fan-folded stack of metallic plates; a first rotatable transfer spool assembly configured to draw the metallic plates from cradle in sequence; and a second cradle configured to receive in reverse order a second fan-folded stack of the plates drawn by the first transfer spool from the first fan-folded stack.

The first rotatable transfer spool assembly preferably comprises a series of arms equally spaced around the assembly, the spacing corresponding with the width of the plates in the stack.

The apparatus may comprise a second rotatable transfer spool configured to receive plates drawn from the first cradle by the first transfer spool and to transfer the plates into the second cradle.

DETAILED DESCRIPTION

The invention will now be described by way of example, and with reference to the enclosed drawings in which.

Figure 1:
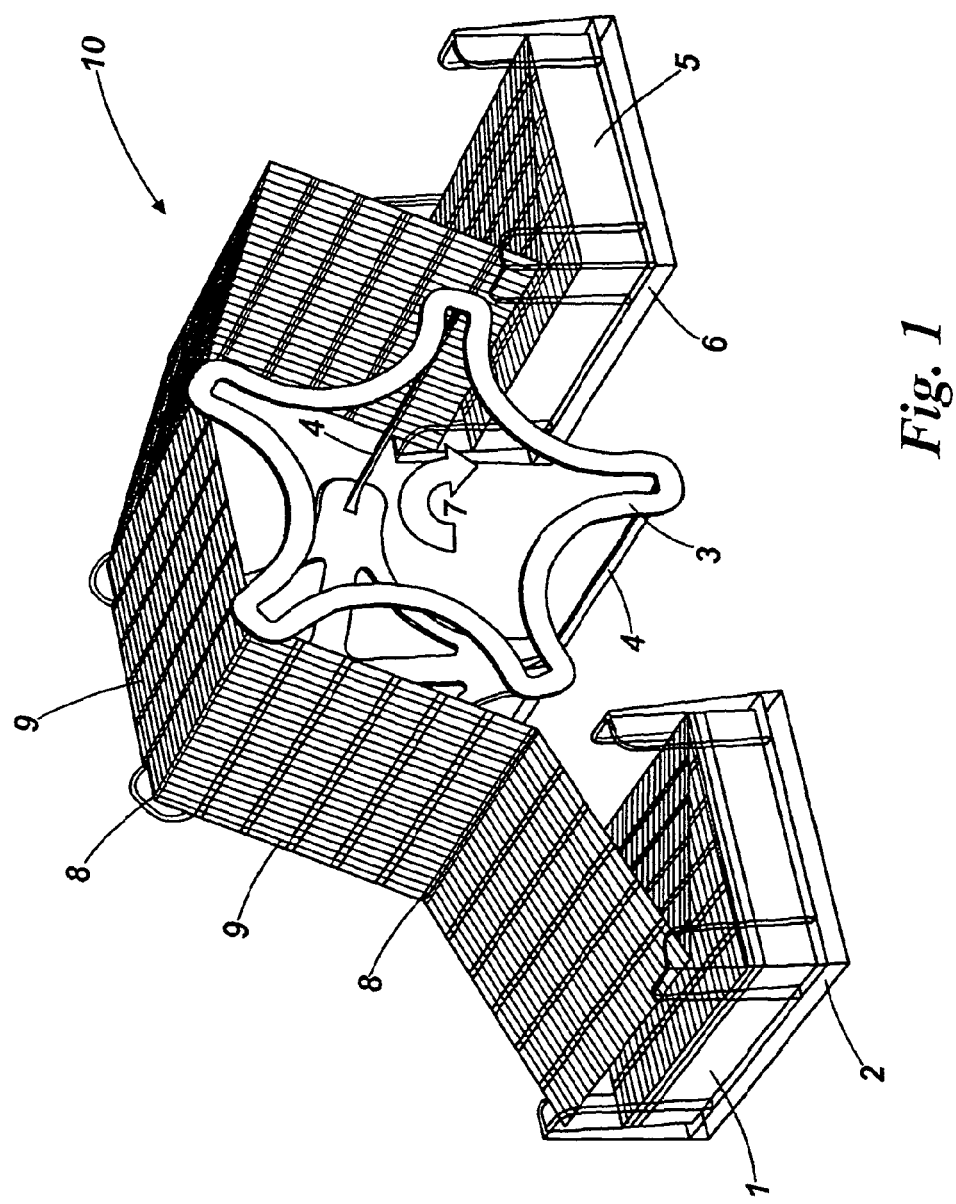
FIG. 1 is a schematic perspective view of a series of plates being transferred from a first to a second fan-folded stack.

FIG. 1 illustrates a schematic overview of the process according to the invention, as embodiment by an apparatus 10 for applying a surface treatment to a series of metallic plates. A first fan-folded stack of plates 1 is held in a first cradle 2. The plates in the stack 1 are drawn out sequentially, for example using a rotatable transfer spool assembly 3 having a series of arms 4 equally spaced around the assembly, the spacing between the arms 4 corresponding with the width of the plates in the stack 1. As the assembly 3 rotates in the direction indicated by arrow 7, the arms 4 connect with adjoining edges 8 of adjacent plates 9, drawing further plates from the stack 1. The same, or a second similar, assembly 3 can be used to re-stack the series of plates to form a second fan-folded stack of plates 5 in a second cradle 6.

Processing of fan-folded stacks of paper is a well-known method for printing, in particular for printing large quantities of computer-generated forms. One example is that disclosed in U.S. Pat. No. 3,683,756, in which a first fan-folded stack of paper is fed into an address printer, which outputs the paper to create a second fan-folded stack of paper having address details printed on each sheet. Such a method would not, however, be suitable for processing metallic plates as shown in FIG. 1, particularly if such plates have stamped surface features as applied to fuel cell electrode plates, because such plates could not be fed using such a system without the plates being permanently distorted.

The assembly 10 shown in FIG. 1 illustrates a basic version of the process according to the invention, in which a single transfer spool assembly 3 is used to unstack and re-stack in reverse order the series of plates. Further steps may be incorporated while remaining within the scope of the invention, for example by having the assembly 3 feed the plates from the first stack into a conveyor system, with a further similar assembly arranged to extract the plates from the conveyor system to re-stack the plates into the second cradle 6. The use of a transfer spool prevents the plates from being distorted during de-stacking and re-stacking.

The plates in the first stack 1 may be interconnected in various ways, for example via tabs connecting adjacent plates, the tabs being configured to yield when the plates are being stacked and re-stacked. Adjacent plates may alternatively be connected by tabs engaging with corresponding slots or by the use of additional temporary hinge components. Examples of different types of hinges are illustrated in FIGS. 2a, 2b, 3a, 3b and 4a, 4b.

Figure 2A:
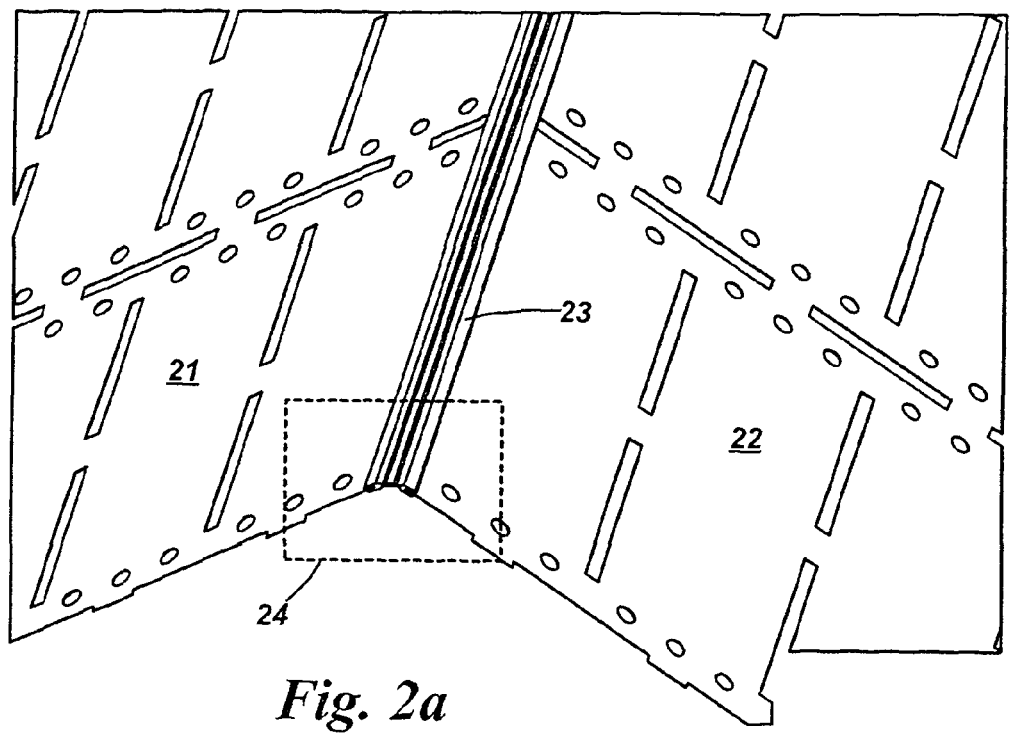
FIGS. 2a and 2b are perspective views of a pair of plates connected along adjoining edges by a first type of hinge.
Figure 2B:
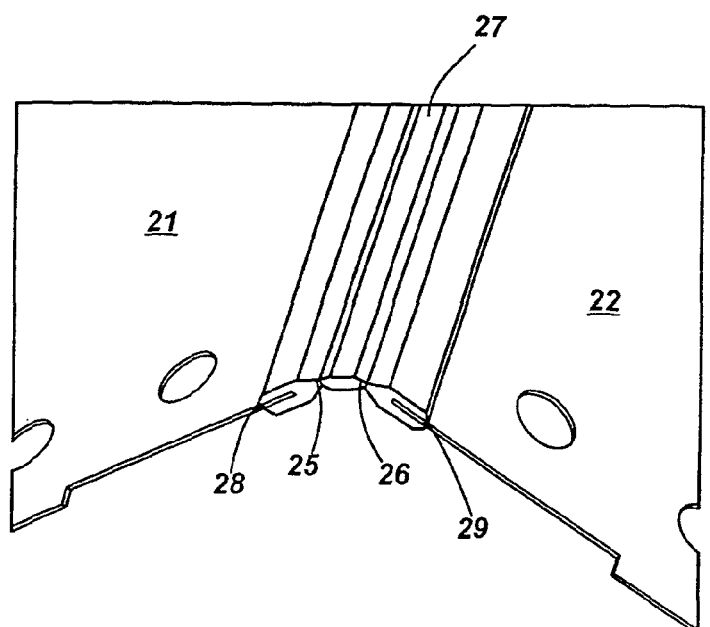

FIG. 2a shows a pair of plates 21, 22 connected along adjoining edges by means of a first type of hinge 23. The hinge 23 in this embodiment is an additional component in the form of a hinged connecting piece formed from a polymeric material. The hinged connecting piece 23 preferably has a uniform cross-section, which makes the component suitable for being formed by an extrusion process. The slots 28, 29 are provided along opposing long edges of the hinge 23, into which the edges of the plates 21, 22 are fitted. Flexibility of the hinge 23 is allowed by the use of two living hinges 25, 26, as shown more clearly in FIG. 2b, which shows an expanded view of the region 24 outlined in FIG. 2a. The living hinges 25, 26 are provided along either side of a connecting piece 27, the combination of which allows the plates 21, 22 to be folded flat. The thickness of the hinge component 23 also allows the plates 21, 22 to have features formed out of the plane of the plates, for example as a result of stamping operations for forming flow channels in the plates, while still allowing the plates 21, 22 to be stacked flat and parallel to each other. The width of the connecting piece 27 can therefore be designed to match the thickness of the plates 21, 22 after any such stamping operations.

Figure 3A:
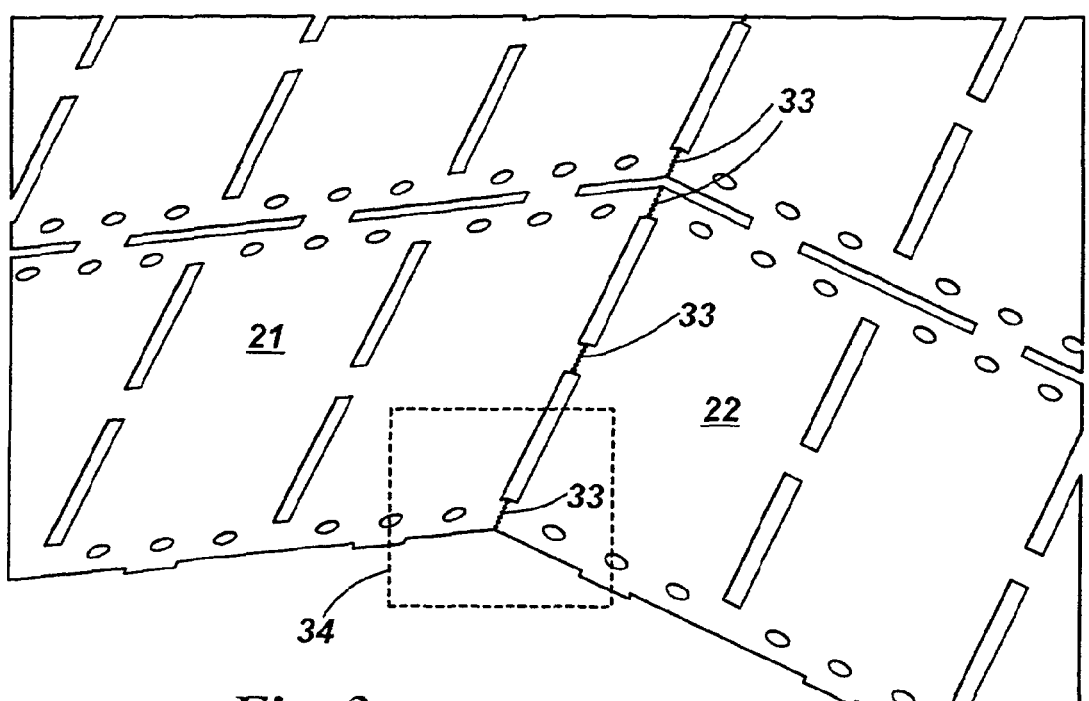
FIGS. 3a and 3b are perspective views of a pair of plates connected along adjoining edges by a second type of hinge.
Figure 3B:
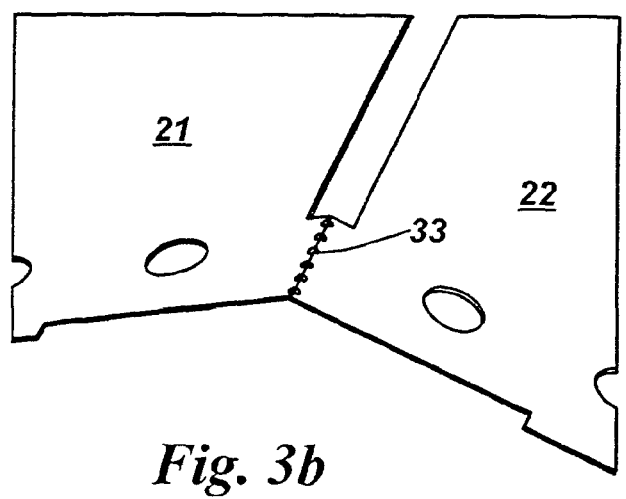

FIG. 3a shows a pair of plates 21, 22 connected along adjoining edges by means of a second type of hinge 33. The hinge 33 in this embodiment is formed by a series of perforations along adjoining edges of the plates 21, 22, which results in the join between the plates being weakened sufficiently to allow the join to be repeatedly folded and unfolded. The hinge 33 is illustrated in more detail in FIG. 3b, which shows a magnified view of the region 34 indicated in FIG. 3a. This second type of hinge has an advantage over the first type of hinge in that no further components are required. The hinge 33 does not, however, allow for an unlimited number of folding and unfolding operations to be carried out, as the hinge 33 will eventually weaken and break due to metal fatigue. The hinge 33 also does not accommodate increases in the thickness of the plates as a result of stamping operations or from other components being joined to the surface of the plates 21, 22. This type of hinge is therefore more suitable for use during operations where the plates are in a planar form without any raised surface features, and for use with a small number of folding and unfolding operations.

Figure 4A:
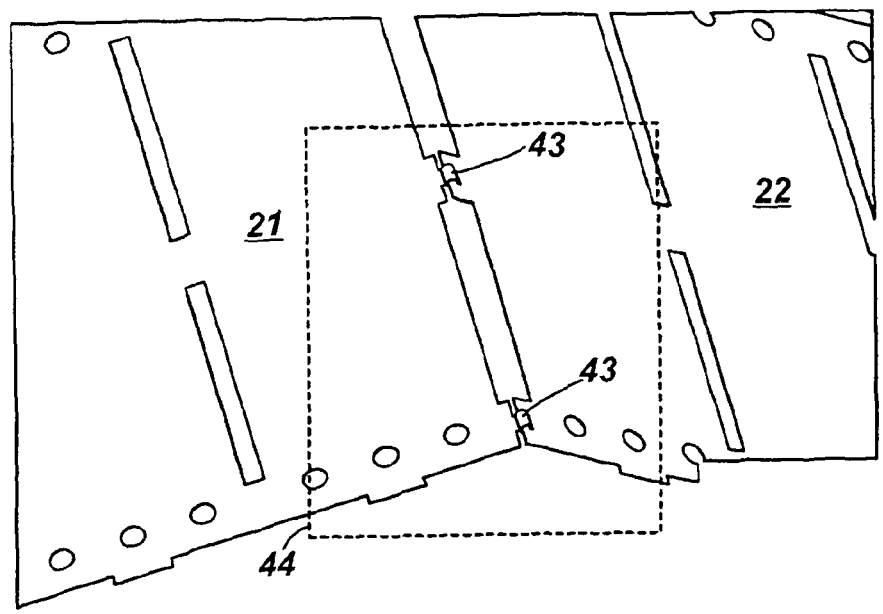
FIGS. 4a and 4b are perspective views of a pair of plates connected along adjoining edges by a third type of hinge; and, FIG. 5 is a perspective view of an assembly for processing a stack of plates through a moulding press.
Figure 4B:
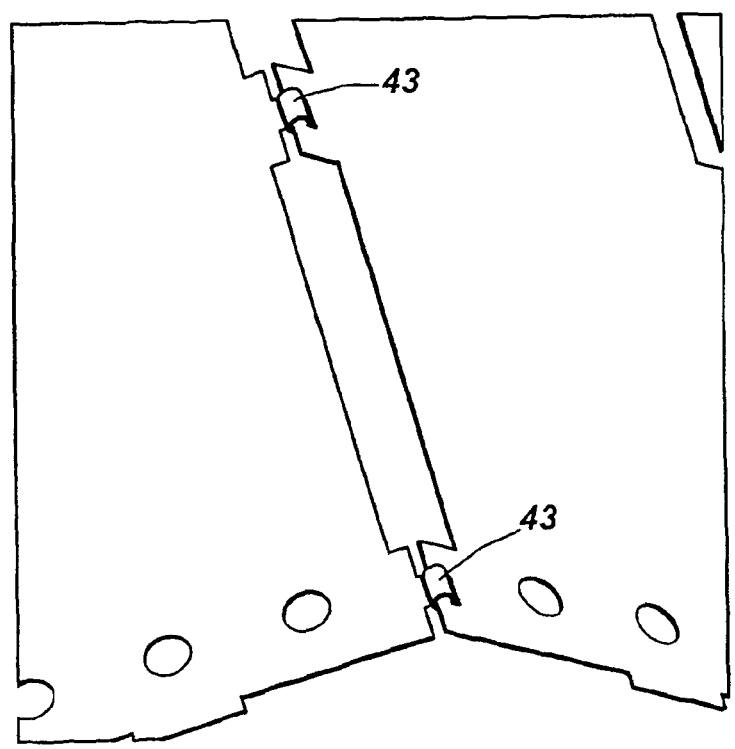

FIG. 4a shows a pair of plates 21, 22 connected along adjoining edges by means of a third type of hinge 43. The hinge 43 in this embodiment is formed by a series of tabs and corresponding slots along adjacent edges of adjoining plates 21, 22. The tabs are each inserted through a corresponding slot and bent to form an interlocking hinge. A magnified view of the hinge 43 is shown in FIG. 4b, which illustrates the region 44 indicated in FIG. 4a. This third type of hinge has similar advantages to the first type of hinge, in that an unlimited number of folding and unfolding operations are possible, and the hinge can allow for the plates to be increased in thickness through stamping operations or by addition of components on a surface, while avoiding the need for the hinge to be formed from an additional component, thereby potentially reducing complexity and cost. This third type of hinge does, however, require an additional processing step for forming the hinge between each pair of adjoining plates that is more complex than the simple punching operation required to form the second type of hinge.

A combination of the second type of hinge with the first type of hinge is possible, for example using the second type for initial cleaning operations on the plates followed by the use of the first type of hinge for subsequent operations. This may in some circumstances be necessary, for example if the cleaning operations involve high temperatures that the hinge component 23 (FIG. 2a, 2b) would not be able to withstand.

A typical fan-folded stack of plates 1 may for example comprise flat rectangular plates that each contain a regular array of components. A 12×12 array of components in each plate, with an series of such plates formed into a stack containing 100 such plates, results in one stack containing 14400 individual components. The process thereby provides an efficient way of handling large numbers of components.

The process of de-stacking to re-stacking is space efficient and could be totally contained within an environment that may be dictated by the process, for example in a sealed vacuum chamber of a PVD (Physical Vapour Deposition) magnetron.

In processes where the surface treatment is a cleaning process, the first (or dispensing) stack could be partially or fully immersed in a cleaning solution, with the transfer spool indexing the plates across an air stripper.

The fan-folded stack can provide a common format suitable for many types of processing that may be required during the manufacture of fuel cell electrode plates. One type of processing that would be particularly suitable for the invention is that of multi-cavity injection moulding, in which components are moulded on to the plates as they are indexed through a moulding tool. The invention is therefore particularly suited for automated handling, both within the processing stage and between different processes.

Figure 5:
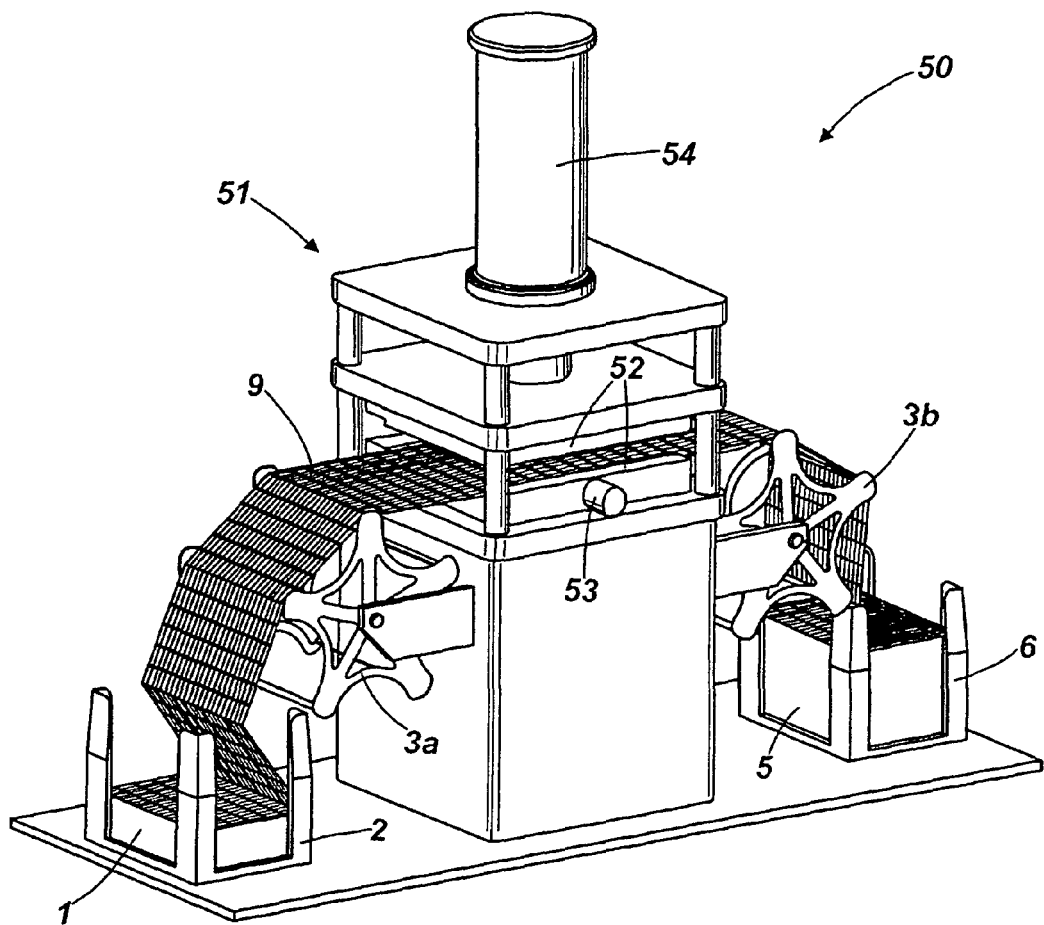

An exemplary embodiment of an assembly for processing a stack of fan-folded plates in accordance with the invention is illustrated in FIG. 5. The assembly 50 comprises first and second rotatable transfer spools 3a, 3b situated either side of a moulding press 51. Each spool 3a, 3b is of the form illustrated in FIG. 1, as described above. Plates from a first stack 1 in a first cradle 2 are drawn out over the first spool 3a, through the moulding press 51 between opposing platens 52 and over the second spool 3b before being folded into a second stack 5 in a second cradle 6. Each cradle 2, 6 may be removable from the assembly 50 to allow a new stack of plates to be introduced and fed through the press 51.

The plates 9 are passed through the press 51 sequentially by means of a stepper motor 53 linked to one or more teeth that engage with corresponding tractor holes provided along one or more edges of the plates 9. The stepper motor 53 and press 51 are configured to be operated such that the plates are moved while the platens 52 are separated and maintained stationary while the press 51 operates. The press 51 is operated by actuating a hydraulic ram 54. The press 51 could alternatively be configured to operate as a stamping press for embossing or punching features on to the plates 9.

Other embodiments are intentionally within the scope of the invention as defined by the appended claims.

The invention claimed is:

1. A method of processing a linked series of substantially inflexible metallic plates, in which each metallic plate is connected to an adjacent metallic plate along adjoining edges, the method comprising:
   providing the series of metallic plates as a first fan-folded stack of metallic plates;
   using a first rotatable transfer spool assembly to draw the metallic plates in sequence from the first fan-folded stack;
   applying a surface treatment to one or more of the metallic plates; and,
   using the first rotatable transfer spool assembly or a second rotatable transfer spool assembly to re-stack the metallic plates in reverse order to form a second fan-folded stack of metallic plates;
   wherein the first rotatable transfer spool assembly and/or the second rotatable transfer spool if present, each comprise a series of contact points equally spaced around the rotatable transfer spool assembly, wherein the contact points are configured to engage with the adjoining edges of the metallic plates, the spacing of the contact points corresponding with the distance between consecutive adjoining edges in the series of metallic plates in the first fan-folded stack.

2. The method of claim 1 wherein a plurality of the metallic plates in at least the second fan-folded stack comprise one or more fuel cell electrode plates.

3. The method of claim 2 wherein each metallic plate in at least the second fan-folded stack comprises a regular array of fuel cell electrode plates.

4. The method of claim 1 wherein the surface treatment comprises one or more of a cleaning, stamping, spraying, moulding and heat treatment process.

5. The method of claim 4 wherein the surface treatment comprises the cleaning process, and the cleaning process comprises at least partially immersing the first fan-folded stack of metallic plates in a cleaning solvent.

6. The method of claim 1 wherein each metallic plate in the linked series of metallic plates is connected to an adjacent metallic plate in the linked series of metallic plates along a line of weakened material joining the metallic plates.

7. The method of claim 6 wherein the line of weakened material is provided by a series of perforations.

8. The method of claim 1 wherein each metallic plate in the linked series of metallic plates is connected to an adjacent metallic plate in the linked series of metallic plates by a hinge.

9. The method of claim 8 wherein the hinge comprises one or more corresponding tab and slot connections joining adjacent plates together.

10. The method of claim 1 wherein the surface treatment comprises a moulding or stamping operation performed on each metallic plate within the linked series of metallic plates following transfer from the first fan-folded stack.

11. An apparatus for applying a surface treatment to a series of substantially inflexible metallic plates, in which each metallic plate is connected to an adjacent metallic plate along adjoining edges, the apparatus comprising:
   a first cradle configured to receive a first fan-folded stack of metallic plates;
   a first rotatable transfer spool assembly configured to draw the metallic plates from the first cradle in sequence;
   and,
   a second cradle configured to receive in reverse order a second fan-folded stack of the metallic plates drawn by the first rotatable transfer spool assembly from the first fan-folded stack;
   wherein the first rotatable transfer spool assembly comprises a series of contact points equally spaced around the rotatable transfer spool assembly, wherein the contact points are configured to engage with the adjoining edges of the metallic plates, the spacing of the contact points corresponding with the distance between consecutive adjoining edges in the series of metallic plates in the first fan-folded stack.

12. The apparatus of claim 11 wherein the contact points of the first rotatable transfer spool assembly comprise a series of arms equally spaced around the first rotatable transfer spool assembly, the spacing corresponding with the distance between consecutive adjoining edges in the series of the metallic plates in the first fan-folded stack.

13. The apparatus of claim 11 further comprising a second rotatable transfer spool assembly configured to receive the metallic plates drawn from the first cradle by the first rotatable transfer spool assembly and to transfer the metallic plates into the second cradle.

14. The apparatus of claim 13 further comprising:
a moulding or stamping press disposed between the first and second rotatable transfer spool assemblies, the press comprising a pair of platens adjacent opposing faces of metallic plates passing from the first rotatable transfer spool assembly to the second rotatable transfer spool assembly.

15. The apparatus of claim 13 whereby the second rotatable transfer spool assembly comprises a series of contact points equally spaced around the second rotatable transfer spool assembly, wherein the contact points are configured to engage with the adjoining edges of the metallic plates, the spacing of the contact points corresponding with the distance between consecutive adjoining edges in the series of the metallic plates in the second fan-folded stack.

16. The apparatus of claim 12 whereby the equally spaced arms are adjustable in relation to the periphery of the first rotatable transfer spool assembly.

17. The apparatus of claim 15, wherein the contact points of the second rotatable transfer spool assembly comprise a series of arms equally spaced around the first rotatable transfer spool assembly, the spacing corresponding with the distance between consecutive adjoining edges in the series of the metallic plates in the first fan-folded stack.

* * * * *